United States Patent [19]

Nedblake et al.

[11] Patent Number: 5,624,520
[45] Date of Patent: Apr. 29, 1997

[54] SYSTEM FOR PRODUCING LABELS FROM A WEB

[75] Inventors: Greydon W. Nedblake, Kansas City; John Garber, Fenton, both of Mo.

[73] Assignee: Greydon W. Nedblake, Jr., Kansas City, Mo.

[21] Appl. No.: 170,706

[22] Filed: Dec. 15, 1994

Related U.S. Application Data

[63] Continuation-in-part of Ser. No. 996,089, Dec. 23, 1992, Pat. No. 5,421,933.

[51] Int. Cl.$^6$ ............................................. B32B 31/00
[52] U.S. Cl. .................. 156/249; 156/152; 156/256; 156/272.8; 156/264; 156/273.3; 156/275.7; 156/289; 156/299; 156/324
[58] Field of Search .................... 156/247, 248, 156/249, 152, 250, 252, 261, 256, 264, 265, 267, 269, 272.8, 273.3, 275.7, 285, 289, 299, 324; 219/121.6, 121.66, 121.67, 121.71, 121.72, 121.76, 121.77

[56] References Cited

U.S. PATENT DOCUMENTS

3,542,621  11/1970  Calhoun et al. .
3,574,026   4/1971  Kucheck .
4,475,969  10/1984  Reed .
4,537,809   8/1985  Ang et al. .
4,540,455   9/1985  Brewer .
4,970,368  11/1990  Yamazaki et al. .
4,986,868   1/1991  Schmidt .
5,201,976   4/1993  Eastin .

Primary Examiner—Esther Kepplinger
Assistant Examiner—Curtis E. Sherrer
Attorney, Agent, or Firm—Hovey, Williams, Timmons & Collins

[57] ABSTRACT

A labelling system (10) dispenses a web (36) of label material having a coating (43) of non-tacky activatable adhesive, subsequently activates the adhesive, cuts the web (36) preferrably using a pair of laser beams (52a, 52b) to produce labels (80) therefrom, and then applies the labels to respective packages (18). In another embodiment (90), a carrier sheet (104) is separated from an adhered web (102) whereupon the web (102) is then cut using a laser beam (52) to form labels (112) and a waste matrix (114). The labels (112) are then rejoined to the carrier sheet (104).

4 Claims, 6 Drawing Sheets

SYSTEM FOR PRODUCING LABELS FROM A WEB

RELATED APPLICATION

This is a continuation-in-part application of Ser. No. 07/996,089 filed Dec. 23, 1992.

BACKGROUND OF THE INVENTION

1. Field of the Invention

The present invention relates to the field of label manufacture. More particularly, the invention concerns a labelling system that dispenses a web of label material having a coating of non-tacky adhesive, subsequently activates the adhesive, cuts the web using a laser beam to produce labels therefrom, and then applies the labels to respective packages. In another embodiment, a carrier sheet is separated from an adhered web whereupon the web is then cut using a laser beam to form labels and a waste matrix. The labels are then rejoined to the carrier sheet.

2. Description of the Prior Art

In the prior art, pressure sensitive labels are produced by using a die to cut a printed web releasably adhered to a carrier sheet in order to form a label and a waste matrix. The matrix is then removed leaving the labels spaced on the carrier sheet that is then formed into a roll. In order to apply the labels to the package, a label dispenser strips the labels from the carrier sheet and applies them to respective packages. The carrier sheet is then discarded as waste.

As those skilled in the art will appreciate, this prior art system of labeling packages presents a number of problems. For example, the carrier sheet typically represents nearly one-half the material cost of label production. This is a tremendous waste of financial and natural resources, and the spent carrier sheet presents an on-going trash disposal burden.

Additionally, a die must be custom manufactured for each type of label and additional dies provided as replacements for worn-out dies. Furthermore, these dies must be stored between production runs.

SUMMARY OF THE INVENTION

The label production system of the present invention solves the prior art problems discussed above and provides a distinct advance in the state of the art. More particularly, the invention hereof eliminates the need for a carrier sheet in the production and application of labels to packages, and eliminates the need for custom manufactured dies for cutting labels from a web.

The preferred label production system is used at the site of package production. A web of non-tacky label material having a coating of activatable adhesive thereon is dispensed from a supply, preferably in the form of a roll. The adhesive is subsequently activated. A laser beam cuts through the web along a continuous, predetermined path in order to produce a label from the web. The label, with the adhesive already activated, is then applied to a package.

In preferred forms, the adhesive coating is heat activatable and is preferably activated by a laser beam. Additionally, the preferred system simultaneously uses two laser beams to cut along divergent paths of the web. A preferred vacuum belt arrangement conveys the cut label body from the web matrix to the package.

Another embodiment is concerned with the production of pressure sensitive labels. A carrier sheet and adhered web are dispensed from a supply and then separated. A laser beam cuts the web while separated in order to produce spaced apart labels and a waste matrix. The web is then rejoined to the carrier sheet and the matrix removed in order to produce a carrier sheet with spaced, pressure sensitive labels thereon.

DETAILED DESCRIPTION OF THE PREFERRED EMBODIMENT

Figures 1, 2, 4, 5, 6:
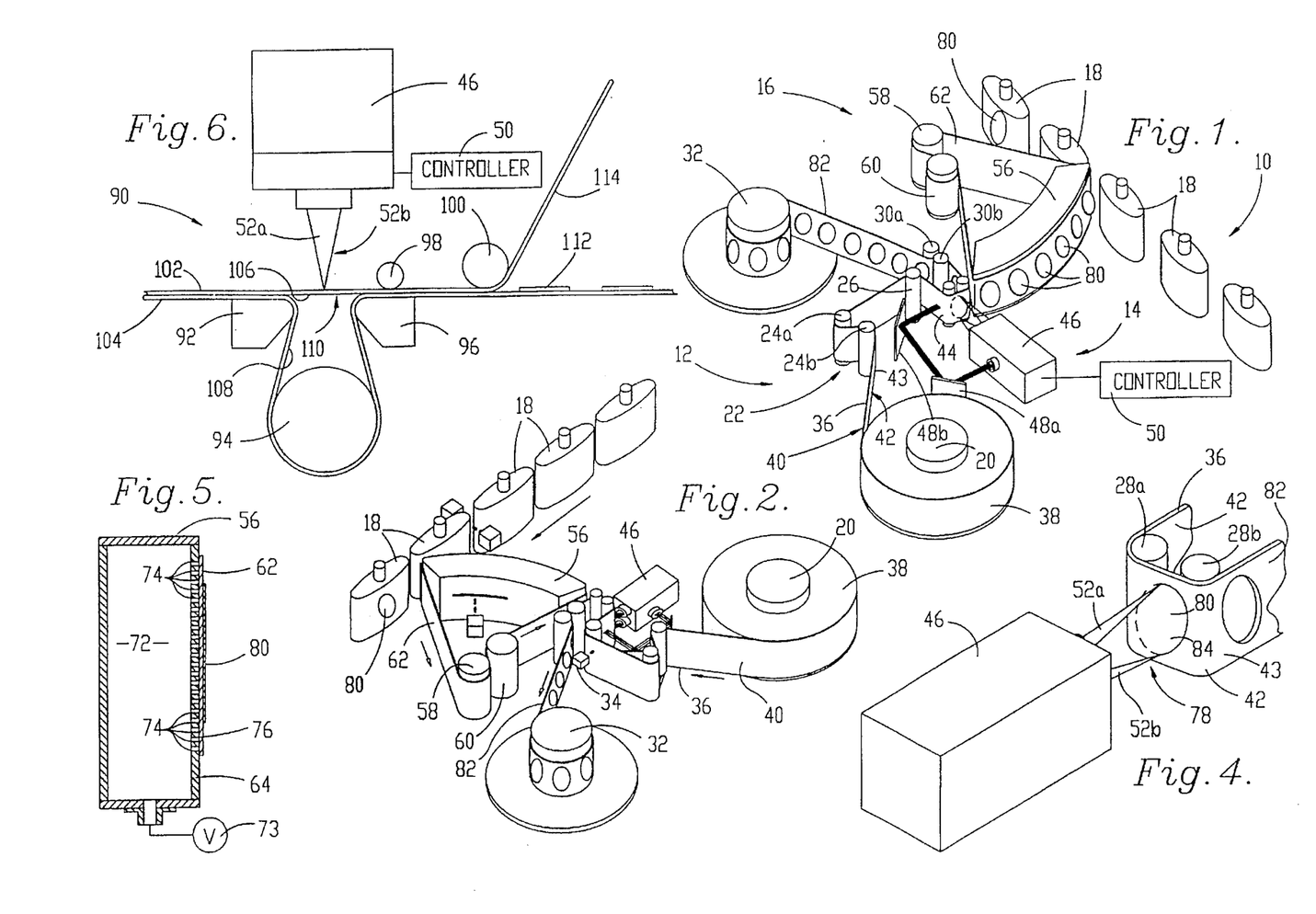
FIG. 1 is a front view of a schematic representation of the preferred label production apparatus.
FIG. 2 is a rear perspective view of the apparatus of FIG. 1.
FIG. 4 is a partial perspective view of the apparatus of FIG. 1 showing the laser and web cutting.
FIG. 5 is a sectional view taken along line 5—5 of FIG. 3.
FIG. 6 is a partial elevational view of a schematic representation of a label production apparatus in accordance with a second embodiment of the present invention.
Figure 3:
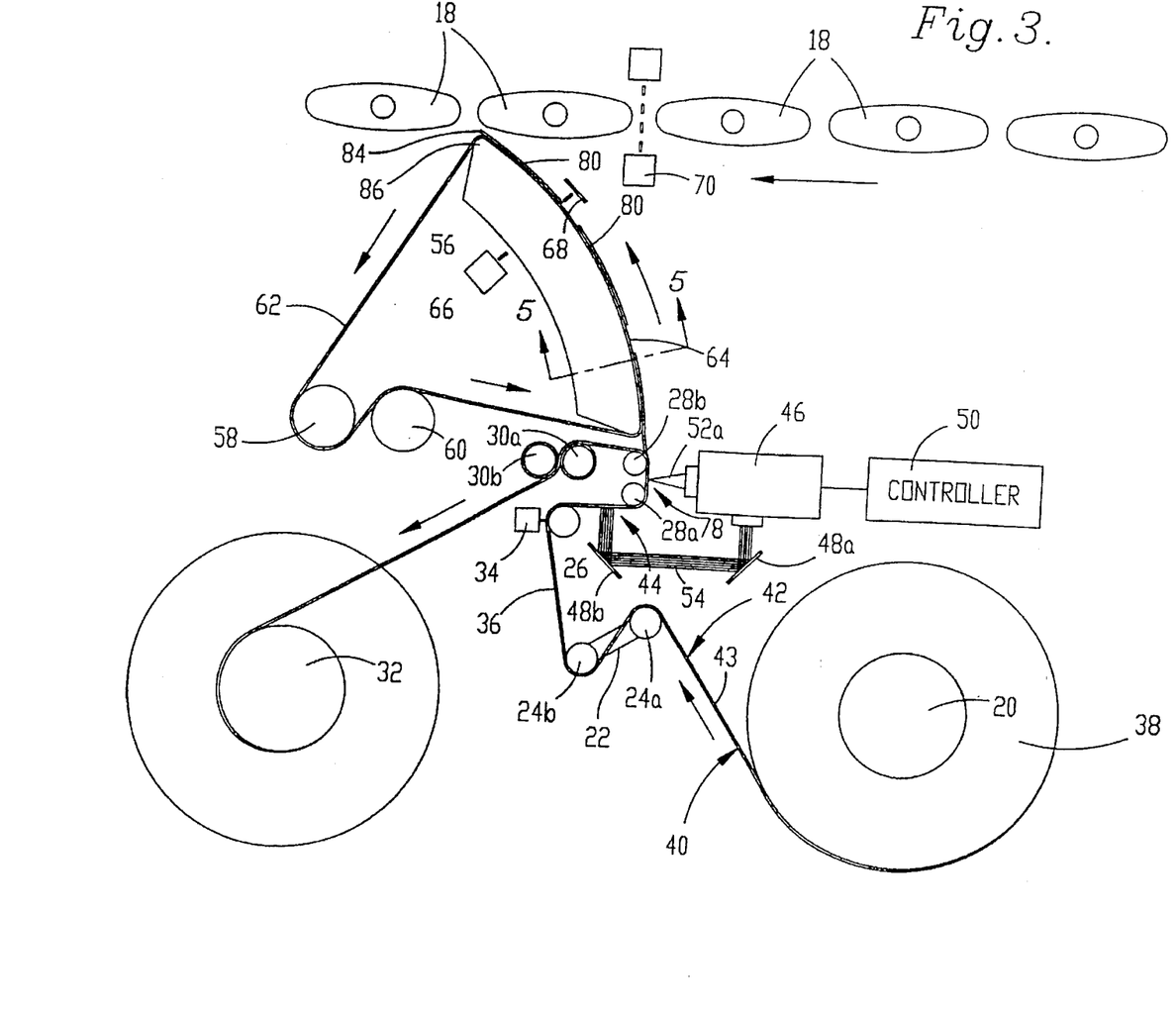
FIG. 3 is a plan view of the apparatus of FIG. 1 showing additional detail.

Referring to the drawing figures, and in particular to FIGS. 1–3, preferred label production apparatus 10 broadly includes web dispensing mechanism 12, laser unit 14, and label application assembly 16 for applying labels to packages 18. In more detail, web dispensing mechanism 12 includes dispensing reel 20, in-feed tension dancer 22 having rollers 24a and 24b, web feed input roller 26, web spacing rollers 28, out-feed drive rollers 30a and 30b, web take-up reel 32, and photoelectric web registration sensor 34 with web 36 routed through mechanism 12 as illustrated. Reel 20 dispenses web 36 from a supply in the form of a roll 38.

Web 36 presents front face 40 with spaced label indicia including registration marks printed thereon, and presents rear face 42 having a coating 43 of non-tacky, heat activatable adhesive. It should also be understood that a wide range of heat activated adhesive materials can be used activatable by infrared or ultraviolet, for example, solvent activated adhesives, or the adhesive could be applied at the site of application. In this way, web 36 is non-tacky as dispensed from supply roll 38 until the adhesive is activated in activation zone 44 as discussed further hereinbelow.

Laser unit 14 includes laser 46, mirrors 48a and 48b and controller 50. Laser 46 is operable to produce upper and lower, continuous, narrow laser beams 52a and 52b, and to produce pulsed, broad laser beam 54 that is routed by mirrors 48a,b to impinge upon web rear face 42 at zone 44 in order to activate adhesive coating 43. Laser 46 is a conventional industrial unit well known to those skilled in the art. The preferred laser unit includes two, 80 watt, carbon dioxide lasers for producing respective beams 52a,b available from Laser Machining, Inc., of Somerset, Wis.

Upper and lower laser beams 52a,b are shiftable in the Y axes in the orientation of FIG. 4 in order to cut through web 36 as it moves past laser 46. These movements are controlled by a beam positioner operated by controller 50, both available from General Scanning, Inc., of Water-town, Massachusetts. Controller 50 is programmed to control the movements of beams 52a,b in coordination with the movement of web 36 and the operation of application assembly 16. More particularly, controller 50 is connected with the electrical components of dispensing mechanism 12, laser unit 14, and application assembly 16 for control thereof, and includes label data stored in memory used to control the movement of laser beams 52a,b as required for a specific label.

Label application assembly 16 includes arcuate vacuum shoe 56, belt drive roller 58, tensioning idler roller 60, porous endless belt 62 extending around forward surface 64 of shoe 56 and around rollers 58,60 as illustrated, photoelectric label sensor 66, photoelectric reflection mirror 68, and photoelectric package sensor 70. Vacuum shoe 56 is preferably composed of aluminum with forward surface 64 polished to present minimal resistance to the movement of belt 62 thereover. The walls of shoe 56 define an interior vacuum chamber 72 coupled with a conventional vacuum source 74. Additionally, a plurality of vacuum openings 74 interconnect chamber 72 and forward surface 64 in order to draw a vacuum through porous belt 62 for holding a label against the outboard surface 76 thereof.

To operate apparatus 10, the appropriate label cutting data is loaded into the memory of controller 50. Roll 38 is placed on reel 20 and the leading edge of web 36 threaded through components 22–30 and onto take-up reel 32. In operation, movement of web 36 is continuous. In response to the detection of a registration mark detected by registration sensor 34, controller 50 activates laser 46 to pulse beam 54 in order to activate adhesive coating 43 on the label portion of web face 42 opposite the corresponding label indicia printed on web face 40.

As the label portion moves through cutting zone 78 defined between rollers 28a,b, laser beams 52a,b cut through web 36 along a predetermined path defined by the label data stored in controller 50. As illustrated in FIG. 4, laser beams 52a,b move up and down to cut through web 36 as it moves past the beams in order to produce a label 80 and a web matrix 82.

As the label portion of web 36 exits cutting zone 78, matrix 82 moves around roller 28b. The leading edge 84 of label 80, however, is no longer constrained by web 36 and bridges the gap between dispensing mechanism 12 and application assembly 16 so that belt 62 engages leading edge 84. The vacuum being drawn on shoe 56 causes label 80 to be held against outboard surface 76 of belt 62. This engagement begins before laser beams 52a,b completes the cutting of label 80. In this way, leading edge 84, and thereby label 80 as a whole, is supported on belt 62 before the cutting of label 80 is complete. As those skilled in the art will appreciate, the speed of belt 62 is matched to the movement of web 36.

The movement of belt 62 carries labels 80 with the front indicia face 40 against belt outboard surface 76 with activated adhesive coating 43 exposed outwardly. Sensor 66 detects when leading edge 84 of label 80 interrupts the photoelectric beam as reflected by mirror 68. As label leading edge 84 approaches the trailing end 86 of shoe 56, it moves beyond the area of vacuum openings 74. This releases the hold on label edge 84 and allows edge 84 to extend beyond the shoe 56 toward an approaching package 18.

Package sensor 70 detects the leading edge of a package 18 so that the movement of package 18 is coordinated with the presentation of label 80, and so that the face of package 18 engages the adhesive activated face of label 80 at the same speed at which the label 80 is dispensed from application assembly 16. When leading label edge 84 engages the face of package 18, it adheres thereto as does subsequent portions of label 80 until the label is fully engaged and adhered to package 18.

FIG. 6 illustrates apparatus 90, which is a second embodiment of the present invention. Apparatus 90 includes a conventional label manufacturing machine and further includes laser unit 46 operable to produce laser beams 52a,b, controller 50, carrier sheet detachment shoe 92, roller 94, attachment shoe 96, pinch roller 98, and matrix roller 100. Web 102 and carrier sheet 104 are threaded through apparatus 90 as illustrated. Web 102 includes a coating of conventional pressure adhesive on lower surface 106, and carrier sheet 104 includes a conventional release coat on upper surface 108.

In a conventional label manufacturing machine, a continuous roller die is used to cut through web 104 while leaving the carrier sheet intact. As those skilled in the art will appreciate, dies are expensive to manufacture and a custom die must be produced for each type of label. Apparatus 90 eliminates the need for a cutting die by using laser unit 46 to cut web 102 according to label data stored in the memory of controller 50.

In operation, carrier sheet 104 is stripped from web 102 at detachment shoe 92, extends around roller 94, and is rejoined with web 102 between attachment shoe 96 and pinch roller 98. Laser beams 52a,b cut through web 102 in the manner described above in connection with apparatus 10 as web 102 moves through cutting zone 110 extending between shoes 92 and 96. With this configuration, the need for a precisely controlled depth of cut is eliminated because of the separation of web 102 and carrier sheet 104 in cutting zone 110. In this way, more powerful laser beams can be used for higher production speeds.

The cutting of web 102 by beams 52a,b produces labels 112 and matrix 114. The leading edge of a label 112 engages carrier sheet 104 before the trailing edge is cut from web 102. Compression between pinch roller 98 and shoe 96 ensures secure reattachmen to Matrix 114 is then stripped from sheet 104 at matrix roller 100 leaving sheet 104 with a plurality of space labels 112 releasably adhered thereto as illustrated.

Laminate Embodiment

Figures 7, 8, 11, 12:
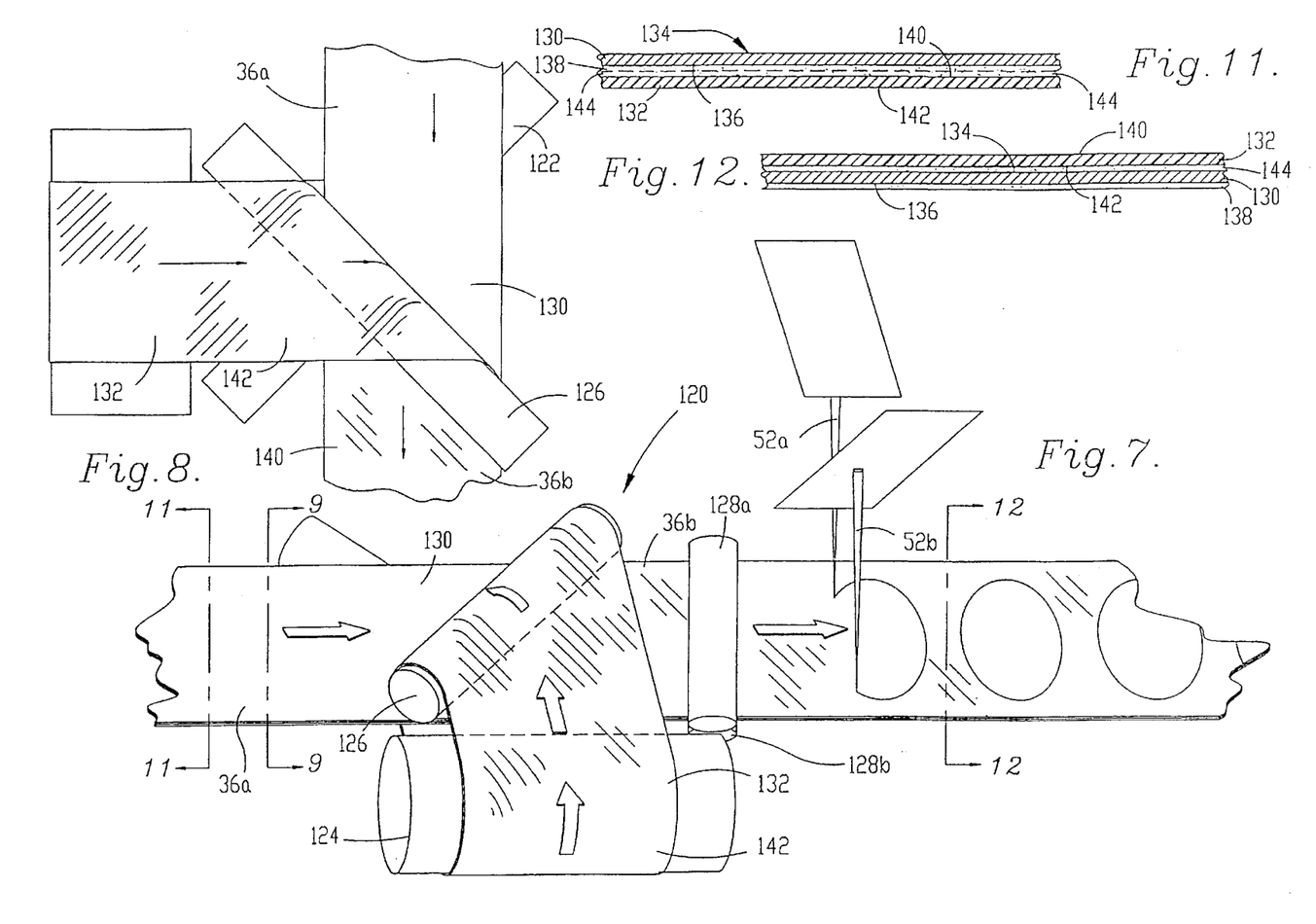
FIG. 7 is a partial, top view of a schematic representation of the laminate embodiment of the label production apparatus of the present invention.
FIG. 8 is a partial bottom view of the apparatus of FIG. 7.
FIG. 11 is a cross-sectional view taken along line 11—11 of FIG. 7.
FIG. 12 is a cross-sectional view taken along line 12—12 of FIG. 7.
Figure 9:
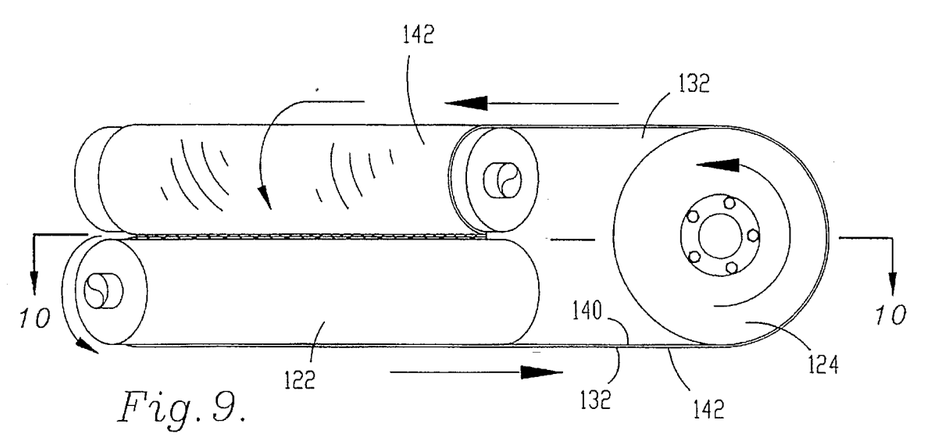
FIG. 9 is an elevational view taken along line 9—9 of FIG. 7.
Figure 10:
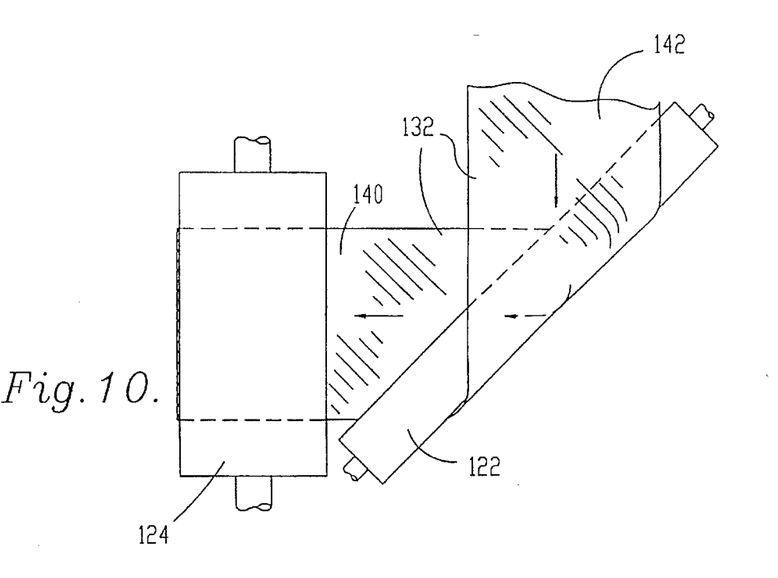
FIG. 10 is a plan view taken along line 10—10 of FIG. 9.

FIGS. 7–12 illustrate laminate assembly 120 of the present invention for use in connection with apparatus 10 when it is desired to produce a laminated label. Turning initially to FIG. 7, assembly 120 includes separation roller 122 (FIG. 8), reversing roller 124, laminating roller 126 and pinch rollers 128a and 128b. As illustrated, rollers 122 and 126 are each positioned at about 45 degrees relative to the direction of travel of web 36a, but are oriented at about 90 degrees relative to one another. In the preferred embodiment, assembly 120 is used with web 36a including base sheet 130 and laminate sheet 132. Base sheet 130 is preferably composed of Mobil Label Lyte synthetic resin film and presents top face 134, bottom face 136 with a coating 138 of pressure sensitive adhesive (Union Carbide Polyacrylate) applied to bottom face 136. Laminate sheet 132 is preferably composed of Mobil Label Mate synthetic resin film and presents upper surface 140 and lower surface 142 with a coating 144 of pressure sensitive adhesive thereon. As viewed in FIG. 11, adhesive coatings 138 and 144 are releasably engaged to superpose base sheet 130 and laminate sheet 132. In other words, as dispensed, base sheet bottom face 136 is engaged adjacent laminate sheet lower surface 142.

In operation, separation roller 122 engages and separates laminate sheet 132 from base sheet 130. The separated portion of laminate sheet 132 is then oriented at right angles to the direction of travel of web 36a. Reversing roller 124 reverses the direction of the separated portion of laminate sheet 132 whereupon laminating roller 126 repositions laminate sheet 132 relative to base sheet 130.

As dispensed from laminating roller 126, laminate sheet lower surface 142 engages top face 134 of base sheet 130 and is adhered thereto by adhesive coating 138. In so doing, laminate web 36b is formed with laminate sheet 132 now on top of base sheet 130. In the preferred embodiment, base sheet top face 134 bears label indicia thereon but does not include any release coating. Because of this, laminate sheet adhesive coating 144 permanently adheres laminate sheet 132 to base sheet 130 to present web 36b with a clear protective lamination. Web 36b then proceeds through apparatus 10 where laser beams 52a and 52b form the desired labels.

Blocked Web Embodiment

Figures 13, 14:
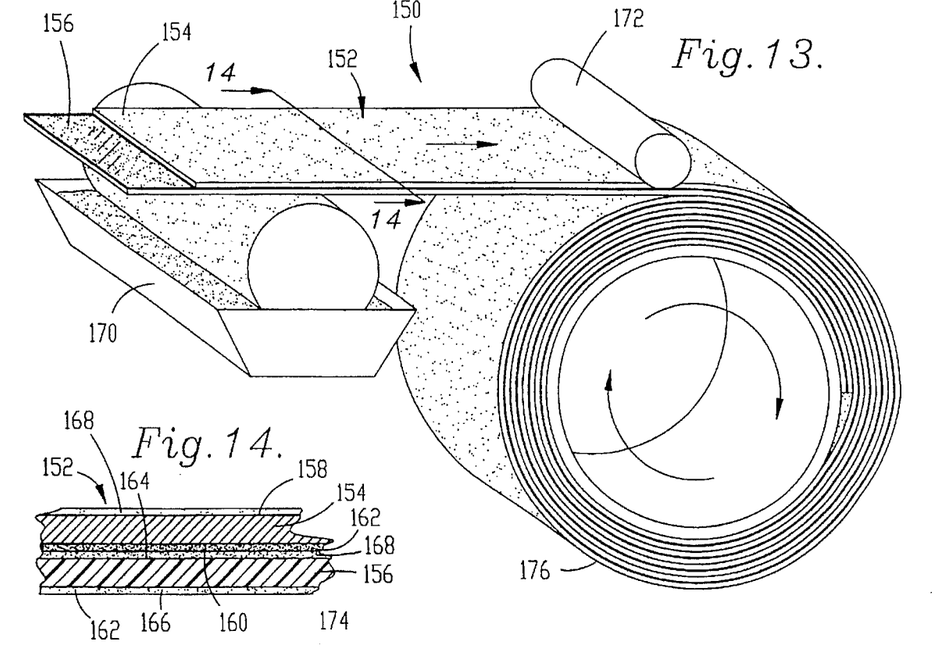
FIG. 13 is a schematic representation of blocked web embodiment of the present invention showing the roll formation process.
FIG. 14 is a partial sectional view taken along line 14—14 of FIG. 13.
Figures 15, 16:
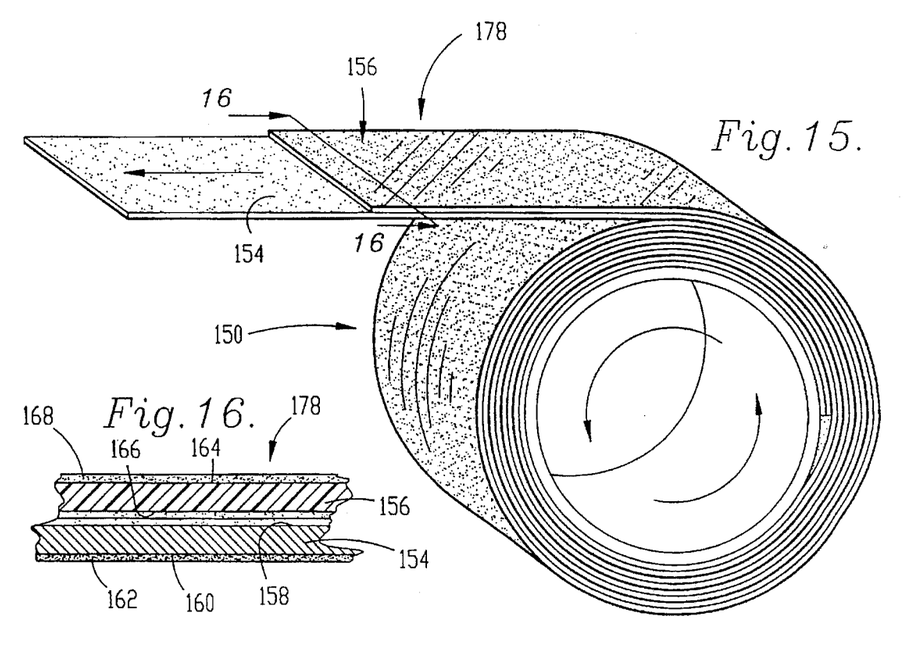
FIG. 15 is a schematic representation of the embodiment of FIG. 13 showing the dispensing process.
FIG. 16 is a partial sectional view taken along line 16—16 of FIG. 14.

FIGS. 13–16 illustrate blocked web embodiment 150 of the present invention for forming a laminated web. As illustrated in FIGS. 13 and 15, web 152 includes base sheet 154 and laminate sheet 156. Base sheet 154 is preferably conventional pressure sensitive stock with reduced caliper for cost savings such as opaque or transparent Mobil Label Lyte film. Sheet 154 presents top face 158 and bottom face 160 having a coating 162 thereon preferably composed of Union Carbide polyacrylate. In the preferred embodiment, label indicia are printed on base sheet top face 158.

Laminate sheet 156 is preferably composed of Mobil Label Mate film and presents upper surface 164 and lower surface 166 with release coating 168 on upper surface 164. Blocked web embodiment 150 further includes conventional adhesive applicator 170 and compression roller 172.

In operation, web 152 passes over applicator 170 which applies adhesive coating 174 to laminate sheet lower surface 166. Coating 174 is preferably a thermal activated adhesive such as Exxon polyisobutylene. Web 152 then passes under compression roller 172 where web 152 is formed into roll 176. As web 152 is formed into roll 176, adhesive coating 174 permanently bonds laminate sheet lower surface 166 to the underlying base sheet top face 158. This process forms laminated web 178 (FIG. 16) in which laminate sheet 156 is permanently bonded to top face 158 of base sheet 154.

Referring now to FIGS. 14 and 16, when laminated web 158 is dispensed from roll 176, base sheet bottom face 160 and pressure sensitive release coating 162 releases from the underlying upper surface 164 of laminate sheet 156 because of the presence of release coating 168 thereon. As dispensed from roll 176, laminated web 178 presents base sheet 154 with transparent laminate sheet 156 thereon and can be used as the supply for apparatus 10.

Dual Web Embodiment

Figures 17, 18:
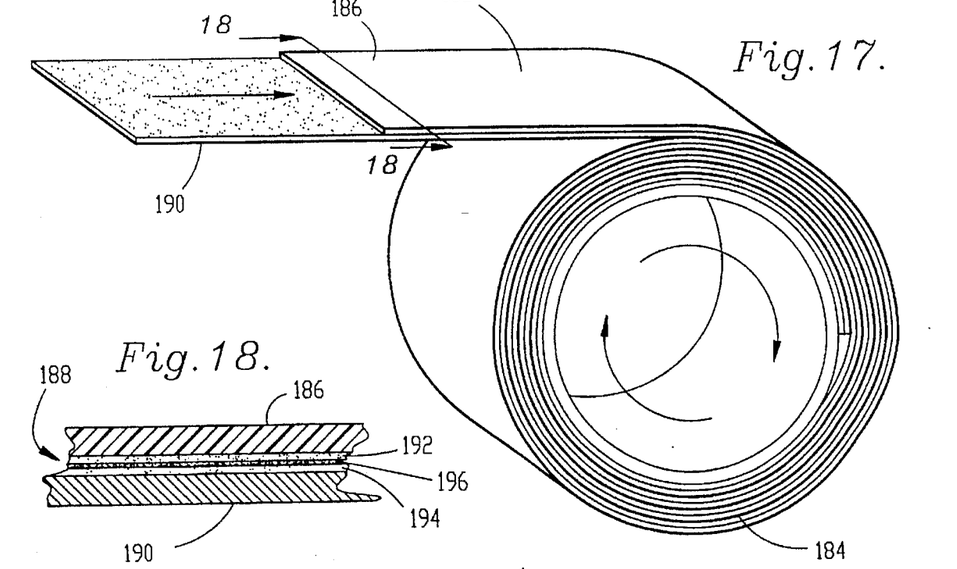
FIG. 17 is a schematic representation of the wound roll of the dual web embodiment of the present invention.
FIG. 18 is a partial sectional view taken along line 18—18 of FIG. 17.
Figure 19:
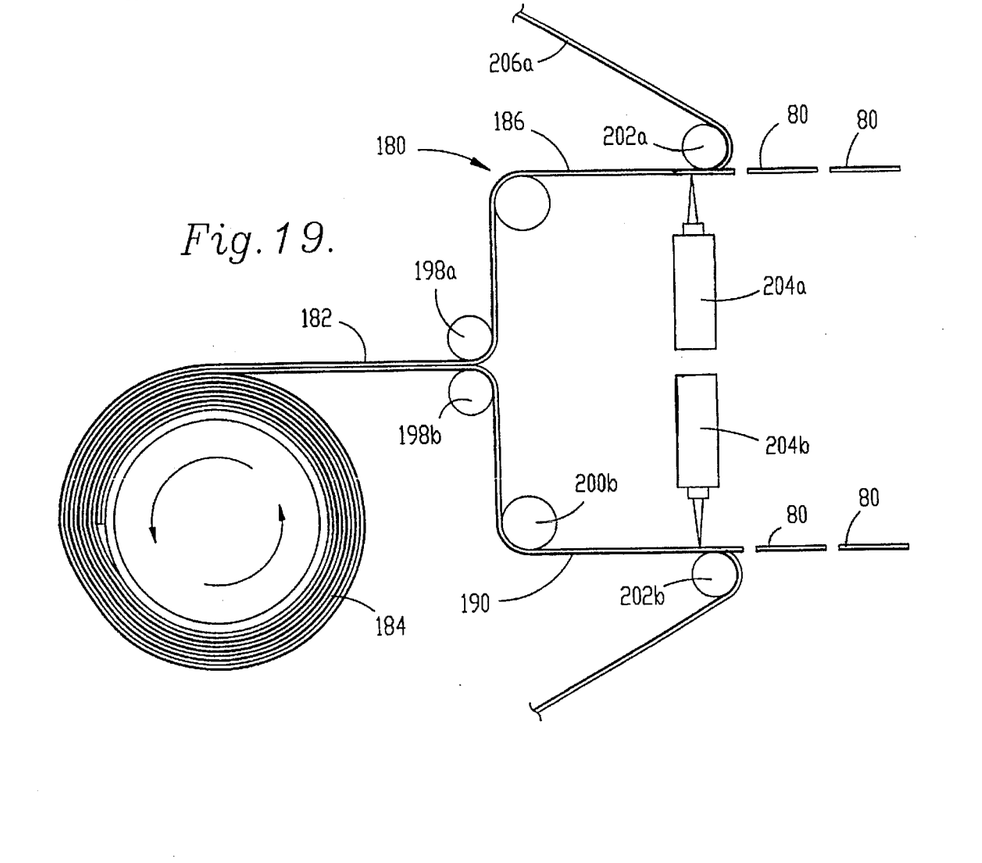
FIG. 19 is a schematic representation of the dual web embodiment of the present invention.

FIGS. 17–19 illustrate the dual layer embodiment 180 of the present invention. Referring initially to FIG. 17 and 18, dual web 182 is formed and then dispensed from roll 184. Web 182 includes first printed web 186, triadhesive layer 188 and second printed web 190. Triadhesive layer 188 is composed of non-tacky activatable adhesive layer 192 on the inboard face of first web 186, a second layer 194 of non-tacky activatable adhesive on the inboard face of web 190, and a relatively thin layer 196 of pressure sensitive adhesive between layers 192 and 194. Adhesive layer 196 maintains webs 186 and 190 in the face-to-face relationship illustrated in FIGS. 17–19.

FIG. 19 illustrates embodiment 180 using dual web 182 and includes roll 184, separation rollers 198a and 198b, direction rollers 200a and 200b, matrix removal rollers 202a and 202b, and two of laser units 46 designated as units 204a and 204b, each with a dual beam output as described above for cutting labels from the associated webs.

In operation, dual web 182 is dispensed from roll 184 and travels between separation rollers 198a,b where webs 186 and 190 separate at adhesive layer 196. More particularly, web 186 with activatable adhesive layer 192 separates from web 190 carrying its layer 194 of activatable adhesive. Web 186 then travels around roller 200a to the vicinity of laser unit 204a which cuts labels 80 therefrom as described above in connection with apparatus 10. Waste matrix 206a is then removed. Subsequently, adhesive layer 192 is activated and labels 80 applied to the package.

Similarly, web 190 with activatable adhesive 194 thereon separated at roller 198 and travels around roller 200b to the vicinity of laser unit 204b which cuts labels 80 from web 190. Waste matrix 206b is then removed by way of roller 202b.

As those skilled in the art will appreciate, dual web embodiment 180 provides a convenient way to double the label production rate of labels dispensed from a single roll. The production of the dual web also presents economies of manufacture.

Dual web 182 can also be configured with adhesive layer 188 to include two layers of adhesive instead of three. In this bi-adhesive embodiment one of the web adhesive layers is a conventional pressure sensitive adhesive and the other is a non-tacky activatable adhesive. The pressure sensitive adhesive portion maintains the dual web in the face-to-face relationship until separated. With this arrangement, only one stream of labels would need to have the adhesive activated.

Having thus described the preferred embodiments of the present invention, the following is claimed as new and desired to be secured by Letters Patent:

1. A method of labelling a package comprising the steps of:
    dispensing a web of label material from a supply thereof;
    cutting through said web using a laser beam along a continuous, predetermined path in order to produce a label body therefrom; and
    applying said label body to a package,
    said web including
        a base sheet presenting a top face and an opposed, bottom face, and
        a laminate sheet presenting an upper surface and an opposed, lower, adhesive surface having a coating of adhesive thereon with said lower adhesive surface releasably adhered to said bottom face of said base sheet, said dispensing step including the steps of removing a portion of said laminate sheet from said base sheet to present a laminate sheet portion and a separate, base sheet portion, and placing said adhesive surface of said laminate sheet portion in contact with said top face of said base sheet portion to form a laminated web as said web for said cutting step.

2. The method of claim 1, said dispensing step including the step of providing said lower face of said base sheet with a coating of adhesive.

3. The method of claim 1, said dispensing step including the step of providing said laminate sheet as a clear film.

4. The method of claim 3, said dispensing step including the step of providing said base sheet top face with indicia thereon.

* * * * *